United States Patent [19]

Tschesche et al.

[11] 3,885,012
[45] May 20, 1975

[54] NEW PROTEASE-INHIBITING SUBSTANCE, ITS EXTRACTION, AND ITS USE

[75] Inventors: Harald Tschesche, Groebenzell; Hans Fritz, Hohenbrunn; Rudolf Christoph, Munich, all of Germany

[73] Assignee: Bayer Aktiengesellschaft, Leverkusen, Germany

[22] Filed: Mar. 2, 1973

[21] Appl. No.: 337,699

[30] Foreign Application Priority Data
Mar. 3, 1972 Germany.......................... 2210262

[52] U.S. Cl.............................. 424/177; 260/112.5
[51] Int. Cl................................................ C07c 103/52
[58] Field of Search ......... 424/177; 260/112, 112.5

*Primary Examiner*—Elbert L. Roberts
*Attorney, Agent, or Firm*—Depaoli & O'Brien

[57] ABSTRACT

There is disclosed a new protease-inhibiting substance obtained from edible snails, and particularly the edible snail, *Helix pomatia*, processes for extraction thereof from the edible snail, *Helix promatia*, and to its use as a medicine.

15 Claims, 2 Drawing Figures

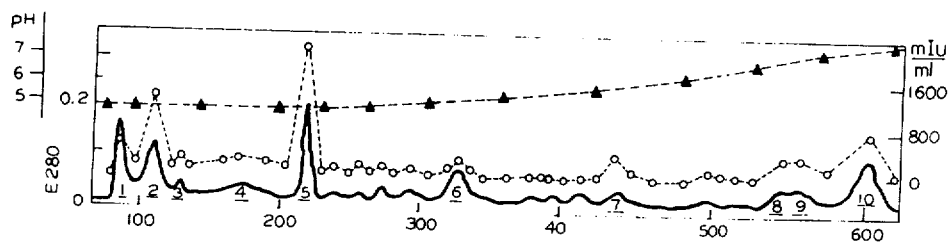

NEW PROTEASE-INHIBITING SUBSTANCE, ITS EXTRACTION, AND ITS USE

BACKGROUND OF THE INVENTION

It has been known heretofore that the blood serum of the edible snail, *Helix pomatia*, contains an inhibitor for trypsin and kallikrein according to the teachings of E. Werle, W. Appel and E. Happ, *Arch. Exp. Path. u. Pharmak.*, 234 (1958), 364–372. In addition, it has also been observed that four polyvalent protease inhibitors are found in the albuminous gland of the edible snail according to the teachings of G. Uhlenbruck, I. Sprenger and I. Ishiyama, *Z. klin. Chem. u. klin. Biochem.*, 9 (1971), 361–362; G. Uhlenbruck, G. Sprenger and G. Hermann, *Z. klin. Chem. u. klin. Biochem.*, 9 (1971), 494–496.

These teachings of prior workers, however, are of little help since the characterization of inhibitors is insufficient in detail.

THE PRESENT INVENTION

The present invention provides, in general, a new protease-inhibiting substance obtained from edible snails, and particularly, the edible snail, *Helix pomatia*, processes for extraction thereof from the edible snail, *Helix pomatia*, and to its use as a medicine.

Specifically, the invention provides a process for the extraction of a novel polyvalent protease-inhibiting substance from the edible snail, *Helix pomatia*, which comprises:

i. homogenizing *Helix pomatia* to produce a homogenate;

ii. separating the homogenate, generally by centrifugation, into a precipitate and a supernatant liquid;

iii. mixing the supernatant liquid with ammonium sulphate up to 63% of the saturation concentration to precipitate the desired protease-inhibiting substance.

The protease-inhibiting substance obtained in accordance with the teachings of the invention contains a plurality of protease-inhibiting materials which, for the sake of convenience and characterization as hereinafter described, will be referred to hereinafter as iso-inhibitors. As is described in greater detail hereinafter, the protease-inhibiting substance produced in accordance with the invention can be further divided into fractions, each of which contains, predominatly, a single iso-inhibitor. Each of the iso-inhibitors of each fraction possess certain common properties while some share other properties. The invention therefore includes the protease-inhibiting substance as defined above, which comprises a plurality of iso-inhibitors as well as the individual iso-inhibitors insofar as they certain properties in common as hereinafter more particularly defined. For the sake of convenience the term "Helicin" is employed hereinafter to denote the protease-inhibiting substance of the invention which contains a plurality of individual iso-inhibitors.

A preferred feature of the protease-inhibiting substance of the invention is that at least three of the iso-inhibitors in the case of the substance containing a plurality of iso-inhibitors, or the iso-inhibitor in the case of the substance containing a single iso-inhibitor, contains 58 amino-acid residues per molecule, in which the histidine or tryptophan residues are absent or free thereof, and has an arginine residue essential to its inhibiting capacity at its reactive center.

The process of the invention for the extraction of Helicin containing a plurality of iso-inhibitors preferably comprises also the following further steps of purification:

iv. adsorbing the substance from aqueous solution onto water-insoluble trypsin resin, washing the resin-Helicin complex thus obtained with neutral or alkaline agueous buffer, and eluting the Helicin from the resin with an acidic aqueous solution; and v. fractionating the Helicin by gel filtration (for example on Sephadex G 50 ) and selecting the most proteolytically-active fraction or fractions.

Finally, the Helicin containing a plurality of iso-inhibitors can be split into fractions each predominantly containing one iso-inhibitor only. This is preferably done according to the invention by fractionating the Helicin on a cation-exchange resin, preferably of the cross-linked dextran gel type, such as S.E.-Sephadex C 25, using elution by a pH-gradient.

The difference between the known inhibitors from the blood serum of *Helix pomatia* and the Helicin according to the invention is demonstrated by the following comparison:

| Inhibitor from Blood Serum | Helicin |
|---|---|
| 1. Inhibition | |
| a) progressive, dependent on the pre-incubation time | Immediate (1 minute) |
| b) progressive, dependent on the incubation temperature maximum at 45°C | Immediately maximal at 25°C |
| c) dependent on the salt concentration, is inhibited by $5 \times 10^{-2}M$ $(NH_4)_2SO_4$ | Independent |
| 2. Temperature effects | |
| a) see above | |
| b) thermolabile | Heat resistant |
| 3. Molecular weight: high molecular, dissociates | Low molecular |
| 4. Chymotrypsin inhibition: none | Inhibits chymotrypsin |

The differences between the above-mentioned four known polyvalent inhibitors from the albuminous glands of *Helix pomatia* and Helicin can be seen from the following comparison:

| Inhibitor from the Albuminous Gland | Helicin |
|---|---|
| 1. Occurrence in organs: albuminous gland | Not in the albuminous gland (but in the mucus, foot and jacket) |
| 2. Inhibition: astonishingly broad spectrum; bromelain, ficin, papain, pronase and thermolysin are inhibited. | Limited and defined; no inhibition of bromelain, ficin, papain, pronase or thermolysin |
| 3. Immunoelectrophoresis in the Uhlenbruck test: positive | Negative |
| 4. Molecular weight: not determined directly, but high molecular according to data of immunoelectrophoresis, or according to elution on Sephadex G-200 before anti-A-agglutinin. | 6,500 (each inhibitor) |

Helicin also differs clearly from the known kallikrein-trypsin inhibitor (KTI), as emerges clearly from the following:

Helicin shows the same spectrum of inhibition as KTI, though each of the purified Helicin iso-inhibitors I.B, I.E and I.G shows a different activity (lower than the starting mixture of iso-inhibitors) towards kininogenases. However, all four enzymes, trypsin, chymotrypsin, plasmin and kininogenases, are clearly inhibited to a greater or lesser degree by Helicin. The inhibition occurs immediately and the final value of the inhibition is reached in less than one minute. In the case of KTI, this takes up to 20 minutes.

The three principal iso-inhibitors in Helicin (i.e., I.B., I.E and I.G, see below) have the same number of amino-acid residues per molecule as KTI (58 radicals), and furthermore have a conspicuously similar amino-acid composition to KTI. In particular, the hydrophobic amino-acids important for the tertiary structure are present in the same number as in KTI: 4 Tyr, 4Phe, 2 Ile, 6 Cys and 6(7) Gly.

The three principal iso-inhibitors in Helicin (I.B, I.E and I.G, see below) possess arginine in the active center and can thus be chemically modified, for example acylated, without inactivation. KTI possesses lysine in the active center.

The isoelectric points of the iso-inhibitors in Helicin are all lower than those of KTI, in part considerably lower in the range of 6 – 9.5, which is physiologically important.

It was surprising to discover low molecular inhibitors in mollusks which have analogous inhibition spectra to polyvalent KTI isolated from mammals, and to isolate these inhibitors therefrom. This is because all other inhibitors isolated from snails are high molecular and KTI does not occur in all mammals or ruminants, except for cattle, which are the exception.

easy chemical modification without inactivation of the Helicin inhibitors, for example, by acylation, as in the production of tetramaleoyl-KTI.

4. The Helicin iso-inhibitors are natural inhibitors which behave like tetramaleoyl-KTI.

5. Particularly acid inhibitors with very low isoelectric points, which cannot be obtained from KTI, can be produced by acylation of Helicin or its iso-inhibitors with dicarboxylic acid anhydrides such as maleic anhydride and succinic anhydride.

As explained above, the Helicin according to the invention is not a homogeneous inhibitor, even though gel filtration indicates an approximately homogeneous molecular weight of about 6,500. Using ion exchange chromatography on SE-Sephadex C-25, we have separated Helicin into at least seventeen active components by means of pH gradient elution. Thus, FIG. 1 illustrates the separation, by ion exchange chromatography, of Fraction I (70 mg) into the subfractions I.1 – I.10 using SE-Sephadex C-25 (column: 1.5 × 140 cm; eluant: 0.05 M $NH_4Ac$, receiver 100 ml pH 4.9; throughput: 14 ml/hour). FIG. 1 shows graphically the extinction at 280 nm, the trypsin-inhibiting activity in mIU/ml, and the pH.

Three of the most active main fractions were prepared pure and characterized in more detail as iso-inhibitor I.B, I.E and I.G, each having 58 amino-acid residues and a molecular weight of about 6,500. In FIG. 1, they can be seen at 2, 5 and 7, and their amino-acid analyses are summarized in the table which follows:

Table

Amino-acid analysis data of the iso-inhibitors I.B., I.E. and I.G. of Helicin (corresponding to purified fractions I.2, I.5 and I.7)

| iso-inhibitors: | I.B | | | | I.E | | | I.G | |
|---|---|---|---|---|---|---|---|---|---|
| Hydrolysis (hours) | 16 | 32[+] | 48[+] | AA/M | 16 | 48 | AA/M | 16 | AA/M |
| Asp | 6.99 | 6.20 | 6.37 | 7 | 5.91 | 5.90 | 6 | 7.01 | 7 |
| Thr | 1.79 | 1.76 | 1.50 | 2 | 2.12 | 1.99 | 2 | 1.94 | 2 |
| Ser | 5.00 | 5.27 | 4.53 | 5 | 5.22 | 4.58 | 5 | 3.24 | 3 |
| Glu | 6.20 | 6.17 | 6.10 | 6 | 7.22 | 6.60 | 7 | 8.32 | 8 |
| Pro | 5.00 | 4.90 | 4.82 | 5 | 4.96 | 4.92 | 5 | 2.64 | 3 |
| Gly | 5.90 | 6.04 | 6.04 | 6 | 7.02 | 6.99 | 7 | 6.03 | 6 |
| Ala | 2.98 | 3.22 | 3.12 | 3 | 2.63 | 2.94 | 3 | 1.93 | 2 |
| Val | — | — | — | 0 | 0.25 | 0.26 | 0 | 2.79 | 3 |
| Cys | 5.97 | 3.58 | 3.60 | 6 | 5.75 | 5.04 | 6 | 5.84 | 6 |
| Met | 0.87 | 0.75 | 0.75 | 1 | 0.85 | 0.74 | 1 | — | 0 |
| Ile | 1.76 | 1.75 | 2.00 | 2 | 1.94 | 1.94 | 2 | 1.87 | 2 |
| Leu | 1.40 | 1.65 | 1.84 | 2 | 0.90 | 0.96 | 1 | 1.18 | 2 |
| Tyr | 3.86 | 3.44 | 3.14 | 4 | 3.78 | 3.38 | 4 | 3.73 | 4 |
| Phe | 3.78 | 3.56 | 3.64 | 4 | 3.88 | 3.52 | 4 | 3.39 | 4 |
| Lys | 1.02 | 1.01 | 1.01 | 1 | 0.98 | 0.96 | 1 | 2.01 | 2 |
| Arg | 4.00 | 4.00 | 4.00 | 4 | 4.00 | 4.00 | 4 | 4.00 | 4 |
| Sum | | | | 58 | | | 58 | | 58 |

Legend:
AA/M = number of residues per molecule
[+] = analytic data from fraction I.2.1[+] after triple re-chromatography As compared to the known inhibitors, including KTI, Helicin and its iso-inhibitors according to the invention possess a plurality of advantages for medicinal use, which can be summarized as follows:

1. Because their isoelectric points lie between 6 and 10, they are better excreted by the kidneys.

2. The more rapid establishment of the inhibition equilibrium in the case of Helicin and its iso-inhibitors is physiologically and therapeutically important.

3. The arginine radical in the reactive center permits

The invention further contemplates the medicinal use of Helicin and its iso-inhibitors. Among the clinical uses of Helicin and its iso-inhibitors are, for example, the following:

i. Direct, local haemostyptic action together with thrombin (if appropriate, with tampon material), and if appropriate also without thrombin and/or other coagulants.

ii. Indirect, local haemostyptic action, prophylactically and therapeutically.

iii. Inhibition of primary hyperfibrinolysis conditions.

iv. Inhibition of excessive secondary hyperfibrinolysis conditions to permit a substitution (fibrinogen) before heparin therapy.

v. Sealing of vessels during heparin therapy or during therapy with other anticoagulants in shock conditions.

vi. Acute pancreatitis.

Under the head (i), Helicin and its iso-inhibitors may be used to achieve a hardened obstructive thrombus, which lasts longer than without such hardening, in haemorrhage conditions, for example for nasal plugging (in three-stage plugging), for stopping bleeding in the Sinus maxillaris after operation, for intensifying the local haemostatic action of the Sengstaken-Blakemore probe in haemorrhaging of oesophagal varices, in cirrhosis of the liver and similar conditions, used as drops on the plugging swab (for example, oxycellulose, fibrin foam, collagen foam), as 1,000 U on the surface of the tampon material (contact surface wetting), and for tamponning haemorrhaging uterus carcinoma-cava as 10,000 U for impregnating the plug.

Under the head (ii), the prophylactic uses of Helicin and its iso-inhibitors include:

1. For intra-operative and post-operative use, to prevent post-operative haemorrhaging and embolisms (about 2 million U in 3 days).

2. Prevention of post-operative haemorrhaging in cases of over-distended uterus and after myomectomy in gynaecology (about 300,000 U per infusionem).

3. Reduction of radiation damage in irradiation of malignant growths (100,000 to 200,000 U before irradiation).

Under the head (iii), Helicin and its iso-inhibitors may be used at a dosage, for example, of 100,000 U per infusionem to block the primary hyperfibrinolysis induced by urokinase and streptokinase, in intermediate haemorrhaging with fibrinogen. They may be administered per infusionem.

Under the head (iv), Helicin and its iso-inhibitors can be used in massive post-natal haemorrhages with immediate danger of fatal loss of blood, together with 3–6 g of fibrinogen; the Helicin may for example be administered intravenously in an amount of 100,000 U.

Under the head (v), Helicin and its iso-inhibitors may be used:

1. in operated intra-cerebral haemorrhaging - 100,000 U given per infusionem.

2. In rhexis haemorrhaging, to prevent microangiooedema - 100,000 U given 2–4 times daily.

3. To seal the hyperpermeable capillary blood stream track in post-haemorrhagic and septic shock, together with an anticoagulant.

This invention includes a pharmaceutical composition comprising Helicin or at least one of its iso-inhibitors as an active ingredient, mixed with an inert diluent. A preferred pharmaceutical composition of the invention is an injectable aqueous solution of Helicin or at least one of its iso-inhibitors, which will generally be blood-isotonic and sterile.

The invention further provides a medicament in dosage unit form containing Helicin or at least one of its iso-inhibitors as an active ingredient, either alone or mixed with a diluent. The term "medicament in dosage unit form" as used here means a discrete, coherent article containing a predetermined individual quantity of the active substance, the said quantity being such that one article is required for a single therapeutic administration. Examples of such medicaments in dosage unit form are tablets, dragees, capsules, suppositories and impregnated tampons. However, a particularly preferred medicament in dosage unit form according to the invention is ampoules containing an injectable (i.e., generally sterile and blood-isotonic) aqueous solution of Helicin or at least one of its iso-inhibitors.

Finally the invention provides a method of inhibiting fibrinolysis or pancreatitis comprising administering Helicin or at least one of its iso-inhibitors to a human or non-human animal, preferably intravenously.

EXAMPLE 1

(see also the appended Separation Diagram 1)

Production and separation of the Homogenate

2 Kg. of *Helix pomatia* (F. J. Jungwirth G.d.b.R., Hausen im Killertal, bei Hechingen, Germany) in the semi-frozen state were separated from their shells and homogenized with 4 litres of water at 0°–10°C. in 10 minutes. The homogenized material yielded 4.1 litres of clear supernatant liquid on centrifuging for 60 minutes at 12,000 revolutions per minute (Sorvall RC 2-B ultracentrifuge, 24,000 g).

The following operations were carried out at 0°–4°C. up to neutralization of the trypsin resin eluate, and then at room temperature.

Precipitation of Helicin with Ammonium Sulfate 1,839 g of solid $(NH_4)_2SO_4$ were dissolved in the supernatant liquid, with constant stirring (447 g/litre; 63% saturation at 3°C). In order to isolate the precipitate, the mixture was centrifuged for 30 minutes at 12,000 revolutions per minute. The precipitate was immediately resuspended in 1.9 litres of water and largely dissolved. An insoluble residue was separated off by centrifuging for 30 minutes at 12,000 revolutions per minute.

Further Purification of the Helicin with Trypsin Resin

The isolation of the Helicin with the aid of active, water-insoluble trypsin resin (cattle trypsin bounded polymerically to CM-cellulose, 7–10 U BAEE/mg; Merck AG, Darmstadt) was carried out by the batch process.

For this purpose, 5 g of trypsin resin which had been swollen overnight in an 0.1 M TRA buffer (0.4 M NaCl; pH 7.8) were stirred with half the inhibitor solution at a time, for 60 minutes at pH 7. After this time, no noticeable inhibiting action towards trypsin remained detectable in the solution.

The resin centrifuged off after 20 minutes at 4,000 revolutions per minute was freed from non-bounded foreign substances by repeated suspension in 0.1 M TRA buffer (0.4 M NaCl pH 7.8) and centrifuging. The sixth and last wash solution with 0.1 M TRA buffer (0.04 M NaCl; 7.8) then no longer showed a coloration. An inhibiting activity was not detectable in the wash water.

The Helicin was then eluted from the resin by stirring repeatedly for 10 minutes with an 0.4 M KCl/HCl solution (pH 1.7) and centrifuging. The eluate was immediately neutralized and had a total volume of 1 litre.

Further Purification of the Helicin by Gel Filtration with Sephadex G 50

The trypsin resin eluate was concentrated on a rotary evaporator at 35°C and 12 mm Hg, freed of the salt which precipitated, and separated into 20 ml fractions on Sephadex G 50 fine (Messrs. Pharmacia, Frankfurt-/Main; particle size 20–80 μ) in a column (6 × 740 cm) equilibrated with 0.1 M acetic acid.

The throughput was 100 ml/hour. The inhibitor fractions free of high molecular substances and salts were concentrated and lyophilized.

The yield of almost white protease-inhibiting substance (Helicin) (Fraction I) was 140 mg.

Separation of the Iso-Inhibitors with Sephadex C 25 by pH-Gradient Elution (see FIG. 1)

70 Mg of the inhibitor substance (Fraction I), dissolved in 2 ml of 0.05 M $NH_4Ac$ buffer of pH 4.5, were charged onto a column (1.5 × 140 cm) of sulphoethyl-Sephadex C 25 (Pharmacia, Frankfurt/Main; particle size 40–120 μ), equilibrated with $NH_4Ac$ buffer of pH 4.9.

In order to achieve an aproximately linear pH-gradient elution, 100 ml of 0.05 M $NH_4Ac$ buffer of pH 4.9 were initially introduced into a narrow cylindrical vessel and connected to 0.05 M NHAc buffer of pH 8.0 in a wide cylindrical beaker. The throughput was 14 ml/hour.

Almost throughout, measured trypsin-inhibiting activities of the individual fractions showed maximum values corresponding to the extinction-diagram.

FIG. 1 shows the course of elution of the components of Fraction 1 by the pH gradient. The maxima representing the component iso-inhibitors are numbered and the corresponding fractions designated herein as I.1, I.2, etc. to I.10.

Re-chromatography with Sephadex C 25

The fractions I.1 to I.10 obtained by pH-gradient elution as described above were each desalted on Bio-Gel P2 (Messrs. Bio-Rad Laboratories, Richmond Cal., USA; 100 – 200 mesh; columns: 0.8 × 30 cm or 0.8 × 60 cm). The desalted fractions were then purified on columns (0.8 × 60 cm) of SE-Sephadex C 25, equilibrated with 0.5 M $NH_4Ac$.

Fractions I.2 and I.5 were re-chromatographed at pH 4.7 and fraction I.7 at pH 5.7.

Separation Diagram 1

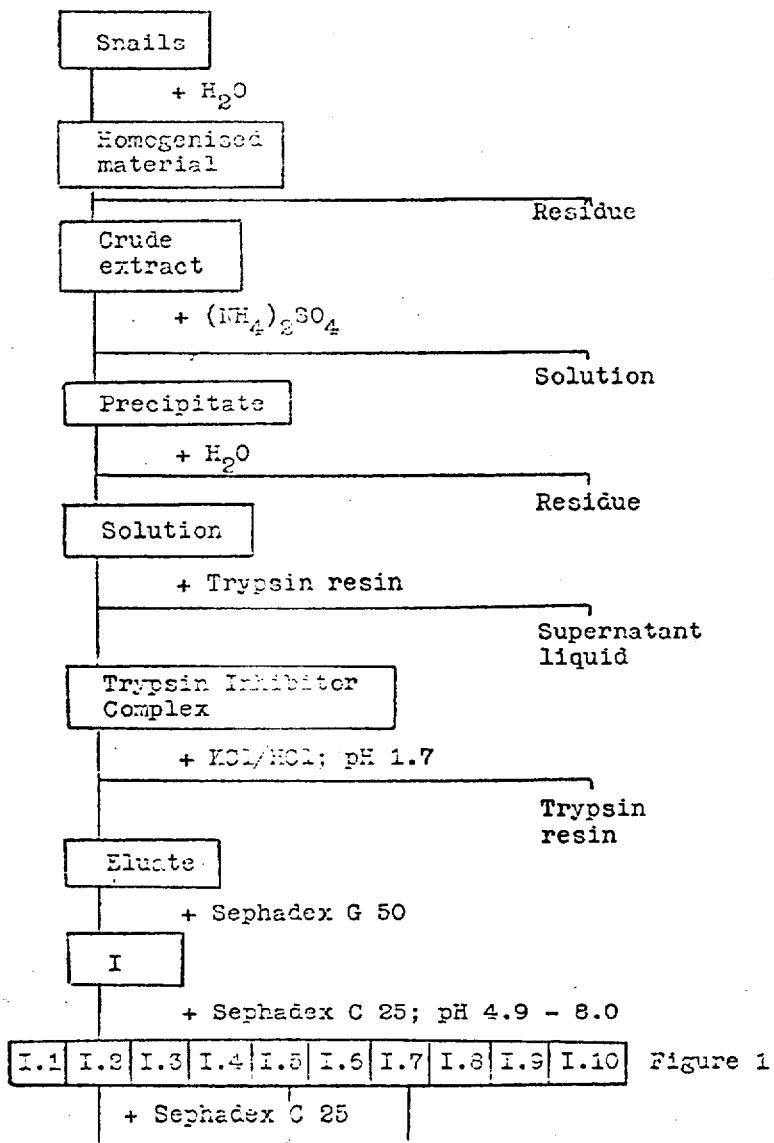

Figure 1

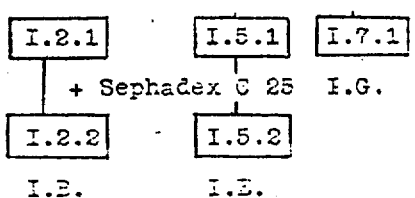

EXAMPLE 2

Production of the homogenate, precipitation with ammonium sulphate, isolation of the inhibitors with trypsin resin and gel filtration with Sephadex G 50 are carried out as described in Example 1. The only difference is that in separating the iso-inhibitors (Fraction I) with Sephadex C 25 by pH gradient elution, a further Fraction I.11 (see Separation Diagram No. 2) is obtained by elution with 0.5 M ammonium acetate buffer, pH 8.0, after elution of the fraction designated I.10 in the sepration diagram.

The separation of the Fraction I (70 mg) thus achieved by ion exchange chromatography into Sub-Fractions I.1 – I.11 by means of SE-Sephadex C 25 (column: 1.5 × 140 cm; eluant 0.05 M $NH_4Ac$, pH 4.9 – 8.0 (receiver, 100 ml of pH 4.9), followed by 0.5 M $NH_4Ac$, pH 8.0, throughput: 14 ml/hour) is represented in FIG. 2.

The iso-inhibitor fraction I.11 thus obtained accounts for about 40–50 percent of the total inhibitor content and represents an extensively enriched preparation which possesses similar properties, with regard to enzyme inhibition, molecular weight and content of aminoacid radicals, to the other fractions.

The Helicin unit mentioned in this specification is defined in H. Tscheche, Th. Dietl, Eur. J. Biochem. 30, 560–570 (1972).

Separation Diagram 2

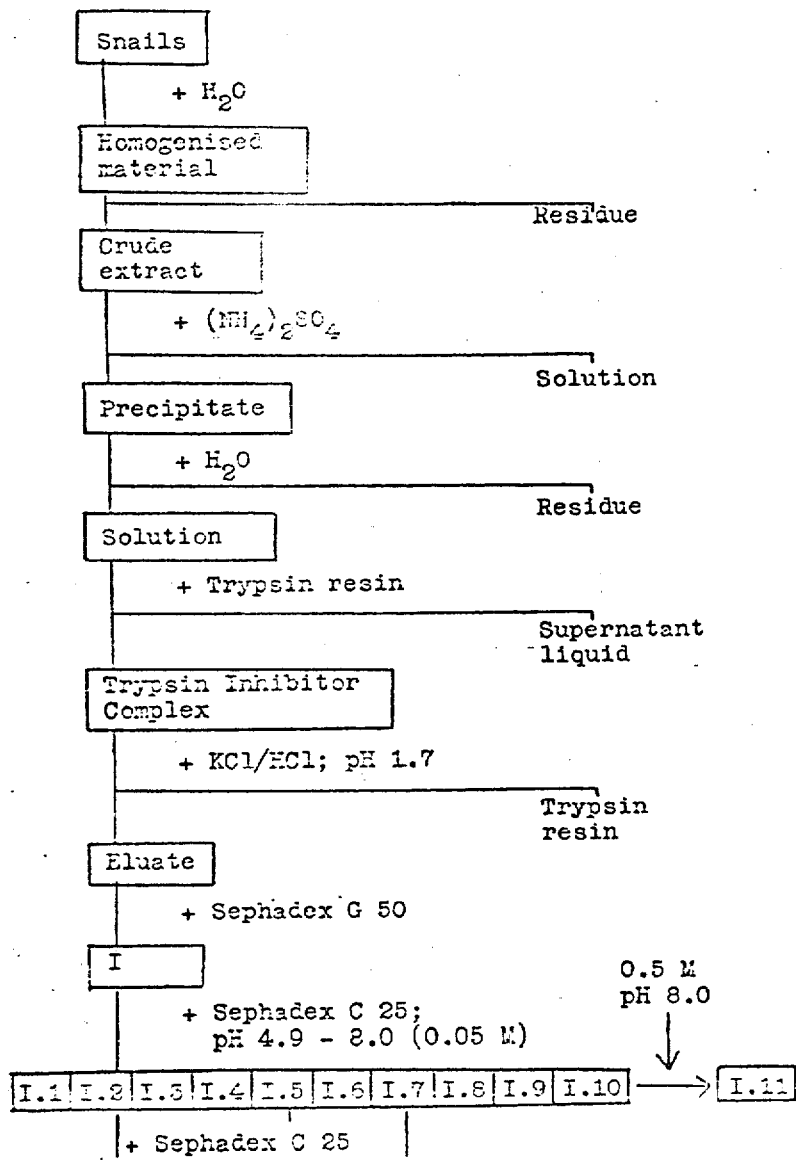

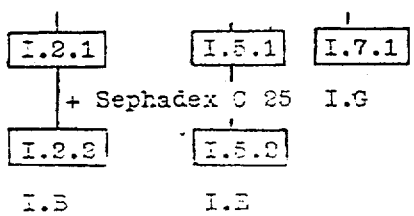

What is claimed is:

1. A protease-inhibiting substance characterized by an inhibiting action toward tyrpsin chymotrypsin, plasmin and kininogenases; said substance containing at least one iso-inhibitor having an isoelectric point below 10.5, a content of 55-70 amino acid residues, and a molecular weight of about 6500, wherein said protease-inhibiting substance is obtained by a process comprising:
   i. homogenizing edible snails of the genus Helix of the family *Helicidae* to produce a homogenate;
   ii. separating the homogenate into a precipitate and a supernatant liquid, and
   iii. mixing the supernatant liquid with ammonium sulphate up to 63% of the saturation cencentration to precipitate the protease-inhibiting substance.

2. A protease-inhibiting substance characterized by an inhibiting action towards trypsin, chymotrypsin, plasmin and kininogenases; said substance containing at least one iso-inhibitor having an isoelectric point below 10.5, a content of 55-70 amino acid residues, and a molecular weight of about 6,500, wherein said protease-inhibiting substance is obtained by a process comprising:
   i. homogenizing *Helix pomatia* to produce a homogenate;
   ii. separating the homogenate into a precipitate and a supernatant liquid, and
   iii. mixing the supernatant liquid with ammonium sulphate up to 63% of the saturation concentration precipitate the protease-inhibiting substance.

3. A protease-inhibiting substance in accordance with claim 1 which contains a plurality of ios-inhibitors having at least in coommon isoelectric points below 10.5, contents of amino acid residues of 55-70 and molecular weights of about 6,500.

4. A protease-inhibiting substance in accordance with claim 2 which contains a plurality of iso-inhibitors having at least in common isoelectric points below 10.5, contents of amino acid residues of 55-70 and molecular weights of about 6,500.

5. A protease-inhibiting substance in accordance with claim 1 wherein said iso-inhibitor contains 58 amino acid residues, free of histidine and tryptophan residues and having an arginine residue essential to its inhibiting activity at its reactive center.

6. A protease-inhibiting substance in accordance with claim 2 wherein said iso-inhibitor contains 58 amino acid residues, free of histidine and tryptophan residues and having an arginine residue essential to its inhibiting activity at its reactive center.

7. A protease-inhibiting substance in accordance with claim 3 further characterized in that each of said iso-inhibitors contains 58 amino acid residues, free of histidine and tryptophan residues and having an arginine residue essential to its inhibiting activity at its reactive center.

8. A protease-inhibiting substance in accordance with claim 4 further characterized in that each of said iso-inhibitors contains 58 amino acid residues, free of histidine and tryptophan residues and having an arginine residue essential to its inhibiting activity at its reactive center.

9. A process for the extraction of a protease-inhibiting substance comprising:
   i. homogenizing edible snails of the genus Helix of the family *Helicidae* to produce a homogenate;
   ii. separating the homogenate into a precipitate and a supernatant liquid;
   iii. mixing the supernatant liquid with ammonium sulfate up to 63% of the saturation concentration to precipitate the protease-inhibiting substance; and
   iv. fractioning the protease-inhibiting substance by gel fractionation and selecting the most active protease-inhibiting fraction or fractions therefrom.

10. A precess for the extraction of a protease-inhibiting substance comprising:
    i. homogenizing edible snails of the genus Helix of the family *Helicidae* to produce a homogenate;
    ii. separating the homogenate into a precipitate and a supernatant liquid;
    iii. mixing the supernatant liquid with ammonium sulfate up to 63% of the saturation concentration to precipitate the protease-inhibiting substance; and
    iv. fractionating the protease-inhibiting substance on a cation exchange resin to obtain a plurality of fractions, each containing a different iso-inhibitor characterized by a peak of protease-inhibiting activity.

11. A pharmaceutical composition containing as an active ingredient a protease-inhibiting substance in accordance with claim 1.

12. A pharmaceutical composition in accordance with claim 11 which is an injectable aqueous solution of the said protease-inhibiting substance.

13. A medicament in dosage unit form containing as an active ingredient a protease-inhibiting substance in accordance with claim 1.

14. A medicament in accordance with claim 13 in the form of an ampoule of injectable solution of the said protease-inhibiting substance.

15. A method of inhibiting fibrinolysis or treating pancreatitis which comprises administering to a human or non-human animal an effective therapeutic dosage of a pharmaceutical composition in accordance with claim 11.

* * * * *